(12) United States Patent
Mccoy (10) Patent No.: US 12,080,073 B2
(45) Date of Patent: Sep. 3, 2024

(54) REMOTE IMAGE PROCESSING CONTROL

(71) Applicant: Raytheon Company, Tewksbury, MA (US)

(72) Inventor: Monty R. Mccoy, Allen, TX (US)

(73) Assignee: Raytheon Company, Tewksbury, MA (US)

( * ) Notice: Subject to any disclaimer, the term of this patent is extended or adjusted under 35 U.S.C. 154(b) by 944 days.

(21) Appl. No.: 17/013,373

(22) Filed: Sep. 4, 2020

(65) Prior Publication Data

US 2022/0076031 A1    Mar. 10, 2022

(51) Int. Cl.
| | |
|---|---|
| G06V 20/58 | (2022.01) |
| B60W 30/08 | (2012.01) |
| G01S 17/42 | (2006.01) |
| H04N 9/73 | (2023.01) |

(52) U.S. Cl.
CPC ............. *G06V 20/58* (2022.01); *B60W 30/08* (2013.01); *G01S 17/42* (2013.01); *H04N 9/73* (2013.01); *B60W 2420/403* (2013.01); *B60W 2554/4048* (2020.02)

(58) Field of Classification Search
CPC .. G06V 20/58; B60W 30/08; B60W 2420/42; B60W 2554/4048; G01S 17/42; H04N 9/73; H04N 23/88
See application file for complete search history.

(56) References Cited

U.S. PATENT DOCUMENTS

| | | | |
|---|---|---|---|
| 7,667,642 B1 * | 2/2010 | Frericks | G01S 19/41 |
| | | | 348/157 |
| 8,013,908 B2 | 9/2011 | Chou | |
| 9,106,879 B2 | 8/2015 | Jiang et al. | |
| 2011/0058802 A1 * | 3/2011 | Forutanpour | H04N 23/70 |
| | | | 396/213 |
| 2017/0364835 A1 * | 12/2017 | Baker | G06Q 10/02 |
| 2018/0196127 A1 * | 7/2018 | Harada | G01S 7/497 |
| 2018/0330531 A1 * | 11/2018 | Mullins | G06T 15/02 |
| 2020/0191946 A1 * | 6/2020 | Kalyandurg | G01S 13/955 |
| 2021/0018991 A1 * | 1/2021 | Shlomot | G06F 3/0383 |
| 2021/0316734 A1 * | 10/2021 | Honda | G06V 20/584 |
| 2022/0012910 A1 * | 1/2022 | Forsberg | G01S 5/163 |

FOREIGN PATENT DOCUMENTS

WO    WO 2011/136993 A1    11/2011

* cited by examiner

*Primary Examiner* — Amara Abdi
(74) *Attorney, Agent, or Firm* — Schwegman Lundberg & Woessner, P.A.

(57) ABSTRACT

A technology for remote object imaging processing. An example of the technology can include calculating geographic coordinates for an object using in part a line-of-sight distance to the object from a camera coupled to a vehicle, calculating an angle of the sun relative to the object using sun position data that corresponds to a time and date and the geographic coordinates for the object, determining a white balance setting based in part on the angle of the sun relative to the object, and applying the white balance setting as a parameter used to process an image of the object captured using the camera coupled to the vehicle.

19 Claims, 5 Drawing Sheets

REMOTE IMAGE PROCESSING CONTROL

BACKGROUND

White balance (WB) is the process of removing unrealistic color casts in an image so that objects which appear white to the naked eye are rendered white in the image. Camera white balance considers the "color temperature" of a light source, which refers to the relative warmth or coolness of white light. Human eyes are good at judging what is white under different light sources, but digital cameras often have difficulty with automatically adjusting white balance (AWB) and can create unsightly blue, orange, or green color casts in images. AWB is a technological method widely used in image capturing devices for determining the color temperature of the light creating a captured image and adjusting for that color temperature. However, this methodology works based on certain assumptions that do not always match perfectly with the captured scene. For example, lighting conditions associated with airborne and satellite imaging may not be known for objects located on the ground or in the air, and an improper white balance adjustment could result in poor image quality.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the disclosure is thereby intended.

DETAILED DESCRIPTION

Before the present disclosure is described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for processing an image of a remote object using white balance settings and other settings that are determined in part on an angle of the sun relative to the object. As used herein, the term "object" refers to any physical object or area of interest that can be captured in an image or photograph using an imaging or photographic technology. Illustratively, an object can be an item, person or other lifeform, landform, structure, etc. located on the surface of the earth or above the surface of the earth (e.g., an airborne object). A remote object can be a stationary object or a moving object. Aerial and/or satellite imaging can be used to capture images of remote objects. Aerial or airborne imaging is the taking of images and video from an aircraft or other type of airborne vehicle. Platforms for aerial imagery can include fixed-wing aircraft, helicopters, unmanned aerial vehicles (UAVs or "drones"), balloons, blimps, and the like. Satellite imagery or spaceborne photography captures images from a satellite platform. A camera mounted to these types of platforms can be used to capture images of remote or distant landscapes, cities, persons, and other objects within view of the camera. However, due to the distance of an object from the camera (e.g., several miles), determining sunlight conditions (solar glint and glare) at the location of the object and adjusting color balance in an image of the object can be difficult. Improper color balance in an image can reduce image quality to the point that the image is not useful for its intended purpose.

In one example of the technology, an object within the view of a camera mounted to a vehicle can be identified and geographic coordinates for the object can be obtained using a line-of-sight distance from the camera to the object. For example, a global positioning system/inertial navigation system (GPS/INS) configured to generate position and angle data for an aircraft can be used to generate geographic coordinates for the object. After determining the geographic coordinates for the object, an angle of the sun relative to the object can be calculated using sun position data that corresponds to both the current time and date and to the geographic coordinates for the object. Having determined the angle of the sun relative to the object, white balance settings can then be determined based in part on the angle of the sun relative to the object, and the white balance settings can be applied as parameters used to process an image of the object captured using the camera mounted to the vehicle.

In photography and image processing, color balance is the global adjustment of the intensities of colors in an image (typically red, green, and blue primary colors). The general method of color balance is sometimes called gray balance, neutral balance, or white balance. Color balance changes the overall mixture of colors in an image and is used for color correction. White balance is a camera setting that adjusts the color balance of light in an image so that the light appears a neutral white. Many digital cameras have an auto white balance setting that can be applied to an image. However, with remote imaging (e.g., aerial and satellite imaging), determining white balance settings calls for sunlight conditions at the location being imaged. The present technology provides one solution for determining sunlight conditions at a location being imaged and adjusting the white balance settings to correspond to the sunlight conditions.

In one example, the present disclosure sets forth a system for remote object imaging, comprising at least one processor; a memory device including instructions that, when executed by the at least one processor, cause the system to: calculate geographic coordinates for an object using in part a line-of-sight distance to the object from a camera coupled to a vehicle; calculate an angle of the sun relative to the object using sun position data that corresponds to a time and date and the geographic coordinates for the object; determine a white balance setting based in part on the angle of the sun relative to the object; and apply the white balance setting as a parameter used to process an image of the object captured using the camera coupled to the vehicle.

In an example, the instructions, when executed by the at least one processor, further cause the system to obtain principal axes data for the camera coupled to the vehicle, wherein the principal axes data are used to calculate the angle of the sun relative to the object and the camera.

In an example, the instructions, when executed by the at least one processor, further cause the system to obtain the sun position data from a data table accessible by the system, wherein sun position data contained in the data table is indexed by times, dates, and geographic coordinates.

In an example, the instructions, when executed by the at least one processor, further cause the system to calculate an altitude of the object, wherein the altitude of the object is used in part to calculate the angle of the sun relative to the object.

In an example, the instructions, when executed by the at least one processor, further cause the system to obtain weather condition information used in part to determine the white balance setting.

In an example, the instructions, when executed by the at least one processor, further cause the system to determine the white balance setting based in part on the line-of-sight distance to the object from the camera coupled to a vehicle.

In an example, the system further comprises a global positioning system (GPS) sensor configured to generate geographic coordinates for the vehicle, wherein the instructions, when executed by the at least one processor, further cause the system to identify a location of the vehicle using the geographic coordinates for the vehicle, wherein the location of the vehicle is used to calculate the geographic coordinates for the object based in part on the line-of-sight distance of the object from the vehicle.

In an example, the GPS sensor further comprises a global positioning system/inertial navigation system (GPS/INS) configured to generate position and angle data for the vehicle, wherein the position and angle data are used to calculate the geographic coordinates for the object based in part on the line-of-sight distance of the object from the vehicle.

In an example, the instructions, when executed by the at least one processor, further cause the system to obtain the time and date from the GPS sensor used to determine the angle of the sunlight on the object.

In an example, the system further comprises an electro-optical (EO) system coupled to the vehicle, wherein the EO system is configured to calculate the geographic coordinates for the object.

The present disclosure also sets forth a computer implemented method, comprising identifying an object that is in a line-of-sight of a camera coupled to a in vehicle; calculating a line-of-sight distance to the object from a location of the vehicle; calculating geographic coordinates for the object based in part on the line-of-sight distance to the object; calculating an angle of the sun relative to the object using sun position data that corresponds to a time and date and the geographic coordinates for the object; determining a white balance setting based in part on the angle of the sun relative to the object; and applying the white balance setting as parameters used to process an image of the object captured using the camera coupled to the vehicle.

In an example, determining the white balance setting further comprises selecting the white balance setting based in part on weather parameters associated with a location of the object and the line-of-sight distance to the object from the camera coupled to the vehicle.

In an example, the object is located on a ground surface. In another example, the object is a moving object. In still another example, the object is an airborne object.

In an example, the vehicle is an aircraft. In another example, the vehicle is a satellite.

The present disclosure still further sets forth a non-transitory machine readable storage medium including instructions embodied thereon, wherein the instructions, when executed by at least one processor receive geographic coordinates for an object identified using an electro-optical (EO) system coupled to a vehicle, wherein the EO system is configured to calculate the geographic coordinates for the object; obtain sun position data from a data table, wherein the sun position data corresponds to a current time and date and the geographic coordinates for the object; calculate an angle of the sun relative to the object using the sun position data; determine a white balance setting based in part on the angle of the sun relative to the object; and apply the white balance setting as a parameter used to process an image of the object captured using a camera coupled to the vehicle.

In an example, the instructions, when executed by the at least one processor, further obtain weather condition information associated with a location of the object; and determine the white balance setting based in part on the weather condition information.

In an example, the instructions, when executed by the at least one processor, further determine the white balance setting based in part on a line-of-sight distance to the object from the camera coupled to the vehicle.

Figure 1:
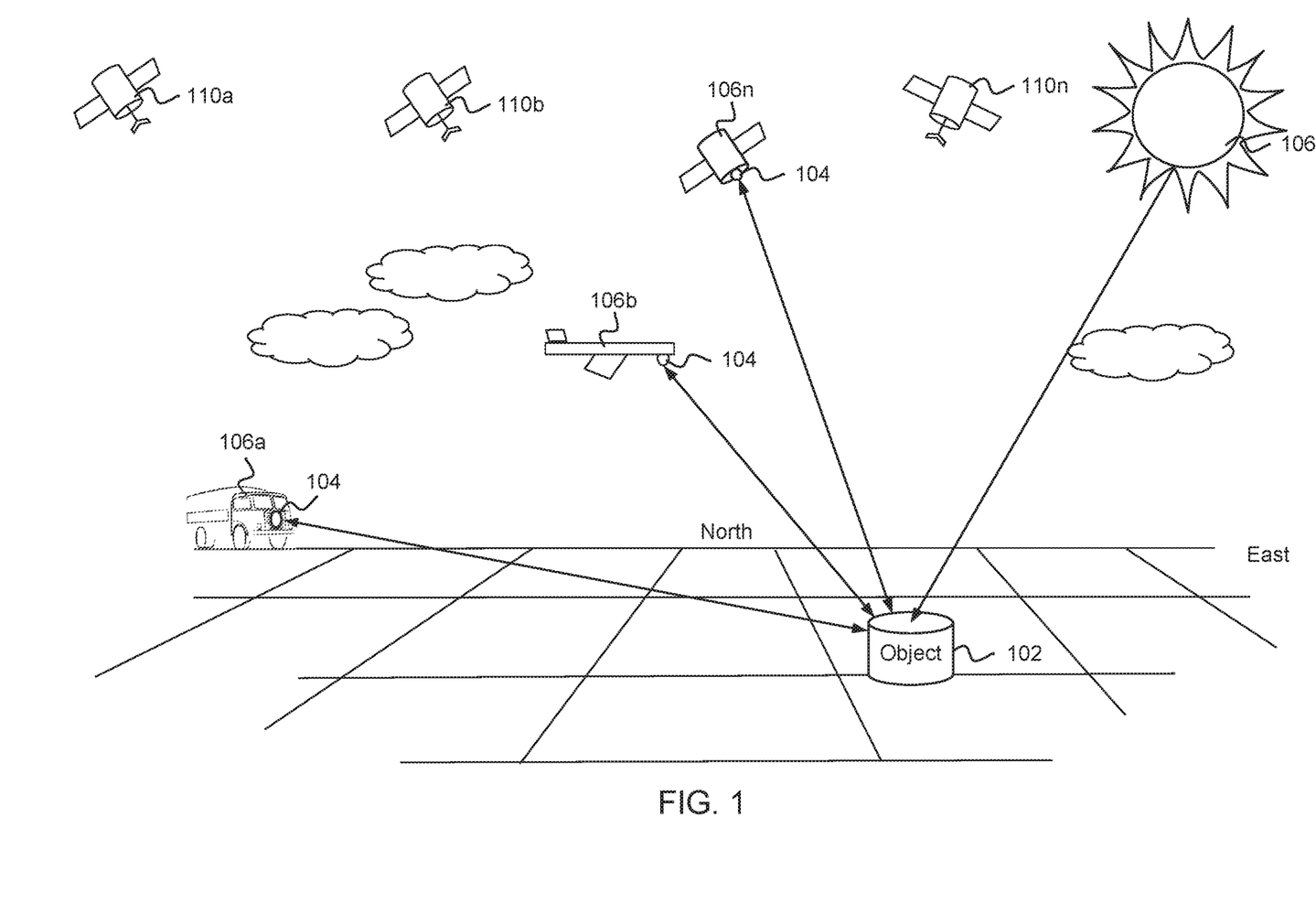
FIG. 1 is a diagram illustrating various example vehicles having an attached camera system configured to capture and process images of a remote object, in accordance with an example.

To further describe the present technology, examples are now provided with reference to the figures. FIG. 1 is a diagram illustrating a high-level example of the technology. As illustrated, a camera system 104 attached to a vehicle 106a-n can be used to capture images (e.g., still images and/or video) of remote or distant objects 102 that are at least partially exposed to the sun 106. The term "vehicle", as used herein, refers to any machine that is used, or is capable of being used, as a platform for the camera system 104, including, but not limited to: aircraft (airplane, helicopter, blimp, etc.), satellite, spacecraft, land-based motor vehicle (trucks, cars, etc.), railed vehicle (trains, trams, etc.), watercraft (ships, boats, etc.), and the like.

In general, three factors influence how natural light renders an object 102, namely: time of day, camera direction, and weather. As part of capturing images of an object 102, the camera system 104 can be configured to evaluate these factors and adjust camera settings based on the evaluation. In one example configuration, the camera system 104 can be configured to identify a remote or distant object 102 that is within a line-of-sight view of the camera system 104 and calculate geographic coordinates for the object 102 using in part a line-of-sight distance from the camera system 104 to the object 102. The geographic coordinates may be part of a geographic coordinate system that specifies locations on Earth using a set of numbers, letters or symbols. The geographic coordinates can represent a geographic position expressed in a combined three-dimensional Cartesian vector. In particular, the geographic coordinates can represent a latitude, longitude, and elevation.

In one example configuration, the camera system 104 can include a global positioning system (GPS) sensor configured to receive microwave signals from GPS satellites 110a-n and generate geographic coordinates associated with a vehicle 106a-n and/or camera system 104 using information contained in the microwave signals. The geographic coordinates for the vehicle 106a-n and/or camera system 104 can then be used to determine a geographic location of the object 102. For example, the camera system 104 can calculate a distance of the object 102 from the vehicle 106a-n and then determine geographic coordinates for the object 102 based on the distance of the object 102 from the vehicle 106a-n. In another example configuration, the camera system 104 can include an electro-optical (EO) system having software and hardware configured to identify an object 102 within a view of the EO system and calculate geographic coordinates for the object 102. For example, an electro-optical targeting system (EOTS) that tracks and locates targets using cameras and laser rangefinders can be used to obtain geographic coordinates for an object 102.

After obtaining geographic coordinates for the object 102, the camera system 104 can use the geographic coordinates to calculate an angle of the sun 106 relative to the object 102 using sun position data that corresponds to a current date and time relative to the object 102 and the geographic coordinates for the object 102. In one example configuration, the camera system 104 can obtain the sun position data from a data table (shown in FIG. 2) using a date and time provided by a GPS sensor. In one example, a time zone associated with the object 102 can be determined, and if the time zone associated with the object 102 is different from a time zone in which the camera system 104 is located, the date and/or time can be adjusted to match the time zone associated with the object. The sun position data contained in the data table may be indexed by date, time, and geographic location. Accordingly, the camera system 104 can perform a lookup in the data table to identify a sun position for the geographic location using a date, time, and geographic coordinates for the object 102.

In one example configuration, the camera system 104 can adjust a sun angle value (e.g., sun elevation and azimuth) to account for a line-of-sight angle from the camera system 104 to an object 102. The line-of-sight angle can be calculated using on one or more of: a camera gimbal position, vehicle principal axes (i.e., pitch, yaw, and roll), and/or a vehicle altitude relative to the object 102. After determining the line-of-sight angle, the camera system 104 can adjust the sun position value (e.g., increase or decrease) to correspond to the line-of-sight angle.

The camera system 104 determines an angle of the sun 106 relative to an object 102 using the sun position data, and the camera system 104 can determine white balance settings based in part on the angle of the sun 106 relative to the object. For example, as described in more detail later, the camera system 104 can obtain a white balance value from a table of white balance values (shown in FIG. 2) that corresponds to a sun position (a position of the sun 106 in the sky relative to an object 102), and the camera system 104 can apply the white balance value as a parameter used to process an image of the object 102 captured using the camera system 104. The position of the sun in the daytime sky relative to an object 102 affects contrast, direction, and color temperature of light that changes the appearance of the object 102 as the day progresses. Although natural light originates from the sun 106, illumination of an object 102 is comprised of several components that include direct sunlight (warmer, high contrast), diffused sunlight (cooler, low contrast), and refracted sunlight (has qualities of reflecting object). Depending on the time of day, the relative amount of each component changes, resulting in an overall illumination of an object 102 with a different white balance or contrast, as illustrated in the table below.

| Time of Day | Contrast | Colors | Direction of Sun |
| --- | --- | --- | --- |
| Midday | Highest | Neutral White | Near Vertical |
| Evening and Morning | High | Slightly Warm | Mid to Low |
| Sunrise and Sunset | Medium | Warm to Fiery | Near Horizontal |
| Twilight, Dawn, and Dusk | Low | Cool Pastel | Below Horizon |

On either side of high noon, the sun 106 dips closer to the horizon. This results in lower contrast because sunlight has to pass through more atmosphere, and the sunlight more easily bounces off the ground toward an object 102. In addition, the atmosphere selectively filters more blue light, resulting in warmer light overall. Midday lighting is primarily comprised of direct, downward sunlight. Such light has little chance to scatter and diffuse through the atmosphere, or to bounce off the ground and illuminate an object 102 indirectly. This results in the hardest and most neutrally-colored lighting of any time of day, and is typically the least desirable type of natural light. Evening and mid-morning light becomes slightly warmer, and begins to cast noticeable shadows. Since direct light originates from an upper side, objects often appear much more three dimensional. Such lighting is usually much more predictable than sunsets and sunrises. The hour just before sunset and just after sunrise (e.g., "golden hour") is typically regarded as having the most desirable light for photography. This is characterized by horizontal light that casts long shadows and gives objects 102 a warm glow. Twilight, dawn and dusk typically describe the half hour before sunrise or after sunset when the sky is still bright but there's no longer any direct sunlight. The primary source of light effectively becomes the entire sky, with one side appearing warm and reddish and the other becoming a cool blue or purple. This can produce soft, multicolored lighting. A white balance value used by the camera system 104 can correspond to changes to these components. More specifically, the table of white balance values referenced by the camera system 104 can contain white balance values that specify a contrast and color for various times of the day and positions of the sun 106.

In one example, the camera system 104 may use additional information to determine a white balance value. For example, weather information associated with a location of an object 102 can be obtained (e.g., via a weather forecast, weather report, weather instrument, etc.), and weather parameters can be used with sun position data to determine a white balance value. Along with time of day, the type and extent of cloud cover is the other most influential cause of lighting variation. Cloud cover primarily influences lighting because it changes the balance between direct sunlight and diffuse skylight, which in turn affects the apparent contrast and color temperature of the light source. Shade and overcast light typically have a cool, soft appearance, since the source of such light is spread across the entire sky, and doesn't include any direct sunlight. Textures therefore appear much subtler, and reflections on smooth surfaces are more diffuse and subdued. The color of such light is also more heavily influenced by bounced light from nearby objects. Weather, effectively is a filter that lies between the sun 106 and an object 102. At one extreme, light can be relatively warm and highly localized, such as sunlight from a clear sky. At the other extreme, light can be cooler and envelop an object 102, such as diffuse sunlight through a densely overcast sky. The thickness and extent of cloud cover is what decides where in this continuum particular weather will have an effect. Accordingly, a data table of white balance values can be indexed by sun position and weather (e.g., clear sky, light overcast, moderate overcast, and heavy overcast), and the camera system 104 can reference the data table to obtain a white balance value that corresponds to the sun position and weather conditions at the location of an object 102. Determining the white balance and other camera settings can be automated to provide a solar glint and glare indicator, and the information used to determine the white balance can be updated for each image/video frame captured using the camera system 104.

Accordingly, the camera system 104 is configured to determine sunlight conditions at a location being imaged and adjust a white balance setting (as well as other camera settings) to correspond to the sunlight conditions at the location being imaged, thereby reducing solar glint and glare that may negatively impact the quality of an image captured and processed using the camera system 104.

Figure 2:
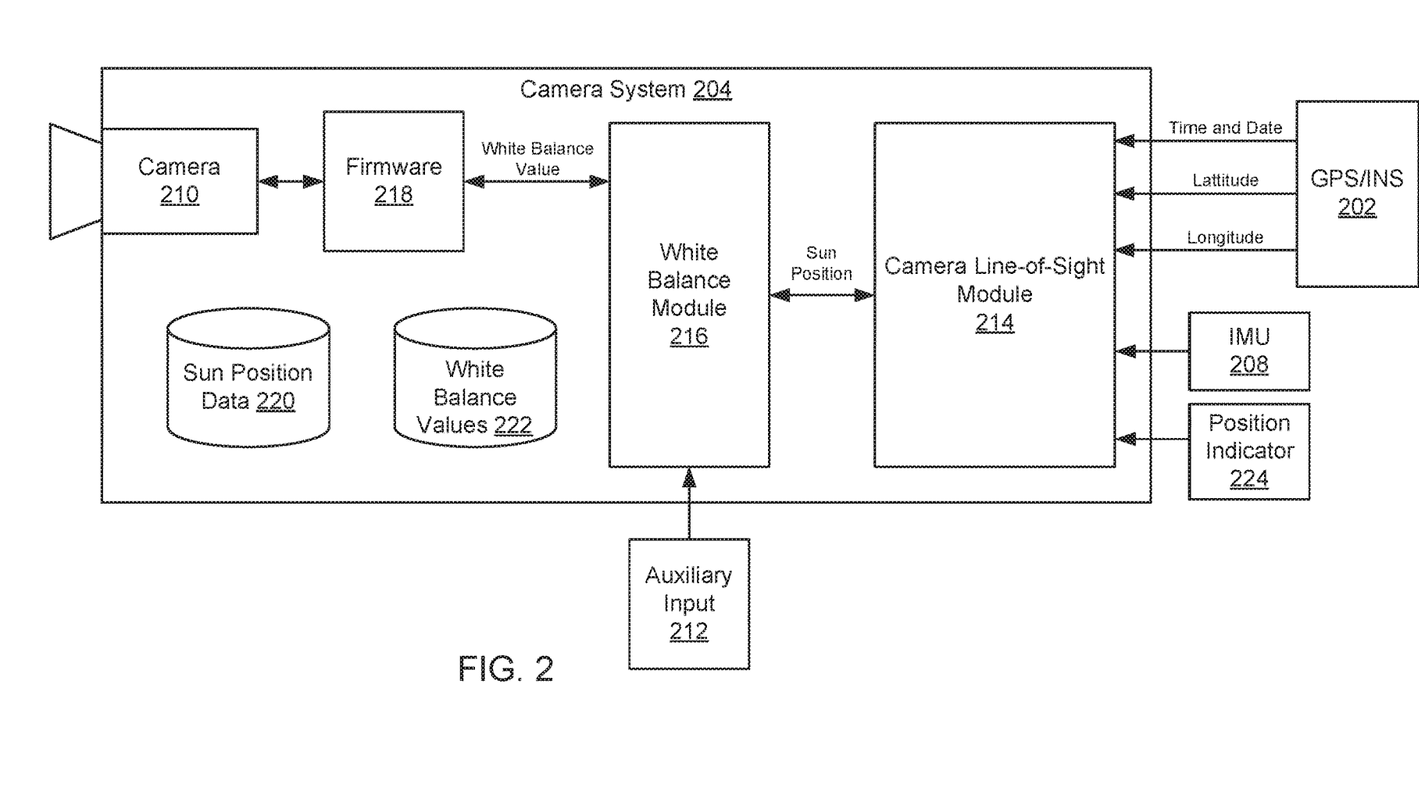
FIG. 2 is a block diagram that illustrates a camera system configured to capture and process images of remote objects, in accordance with an example.

FIG. 2 is a block diagram that illustrates an example camera system 204 configured to capture and process images of remote or distant objects. The camera system 204 can be mounted to a vehicle platform (e.g., an aircraft or satellite) and used to capture images and video of distant objects within view of one or more cameras 210 included in the camera system 204. Illustratively, the camera system 204 can be mounted to a vehicle using a gimbal rig (not shown) that allows a camera operator to position the camera 210 so that the camera 210 is facing a remote object and capture one or more images of the object.

The camera system 204 can be configured to approximate sunlight conditions (e.g., solar glint and glare) at the location of a remote object within view of the camera 210 and adjust the color balance of an image of the object captured using the camera system 204. In one example configuration, the camera system 204 includes a camera line-of-sight module 214 and a white balance module 216. It is contemplated that the camera line-of-sight module 214 and white balance module 216 can be installed on a camera system 204 that is preconfigured to perform white balance and is color calibrated, and that the modules 214 and 216 can be used to override or replace the preconfigured white balance and color calibrations. It is also contemplated that a camera system 204 can be manufactured to include the camera line-of-sight module 214 and the white balance module 216.

The camera line-of-sight module 214, in one example, can be configured to calculate geographic coordinates for an object that is within a line-of-sight of the camera 210 and calculate an angle of the sun relative to the geographic coordinates for the object using sun position data that corresponds to a time and date and location of the object. In one example configuration, the camera line-of-sight module 214 can calculate geographic coordinates for an object using location/position data for a vehicle, to which the camera system 204 is mounted, and a line-of-sight distance from the vehicle to the object. Location/position data for the vehicle can be obtained from, for example, a GPS/INS 202 that is configured to generate position and angle data for the vehicle. As will be appreciated, location and position data can be obtained from other types of sensors and/or systems, such as a stand-alone GPS sensor, an inertial navigation system (INS), an internal measurement unit (IMU), an aircraft control position indicator, and/or another appropriate type of sensor capable of providing vehicle location/position information. A line-of-sight distance from the vehicle to the object can be obtained using, for example, a laser rangefinder mounted to the vehicle, or using another appropriate distance estimation technique. After obtaining the location/position data for the vehicle and the line-of-sight distance of the object from the vehicle, the camera line-of-sight module 214 can determine the geographic coordinates for the object based on the line-of-sight distance of the object from the location and position of the vehicle.

In one example configuration, the camera system 204 can be incorporated into an electro-optical (EO) system coupled to a vehicle. The EO system may be configured to identify an object that is within a line-of-sight of a camera 210 included in the EO system and generate geographic coordinates for the object. The geographic coordinates for the object can be obtained from the EO system and the white balance module 216 can use the geographic coordinates to calculate an angle of the sun relative to the object. It is contemplated that other types of target acquisition systems can be used to identify a remote object and determine a geographic location/position of the object which can be used by the camera line-of-sight module 214 to determine a sun position at the location of the remote object.

After calculating the geographic coordinates for the object, the camera line-of-sight module 214 can be configured to approximate a sun position or sun angle at the geographic location where the object is located. In one example configuration, the camera line-of-sight module 214 can be configured to determine an angle of the sun relative to an object using sun position data 220 that corresponds to a current date/time and geographic coordinates for the object. The sun position data 220 can be obtained from a data table (e.g., a lookup table) that is accessible to the camera system 204. The sun position data 220 may comprise sun elevation and azimuth indexed by date, time, and geographic coordinates. In one example, the sun position data 220 can be stored in a memory device included in the camera system 204. In another example, the sun position data 220 can be stored in a remote location that is accessible to the camera system via an input connection or network (e.g., an external hard drive, an external system located in a vehicle that includes the camera system 204, a remote data center, etc.). After determining the angle of the sun relative to an object, the camera line-of-sight module 214 can send (transmit) sun position values (e.g., sun elevation and azimuth) to the white balance module 216.

In one example, the camera line-of-sight module 214 can be configured to adjust sun position values (e.g., sun elevation and azimuth) to account for a line-of-sight angle from a vehicle and/or camera position to an object. The line-of-sight angle can be calculated using on one or more of: a camera gimbal position, vehicle principal axes (i.e., pitch, yaw, and roll), and/or a vehicle altitude relative to an object, and the sun position values can be adjusted based on the line-of-sight angle. As an illustration, camera gimbal position information can be obtained from a position indicator 224, principal axes data for a vehicle can be obtained from an IMU 208, and a vehicle's height above or below an object can be determined, and one or more of these values can be used to calculate a line-of-sight angle from a vehicle and/or camera position to an object. The line-of-sight angle can then be used to adjust the sun position values to correspond to the position of the vehicle and/or camera.

After calculating a sun position, the camera line-of-sight module 214 can send (transmit) the sun position to the white balance module 216. The white balance module 216 can be configured to determine a white balance value based in part on the sun position. In one example, the white balance module 216 obtains a white balance value 222 that corresponds to the sun position received from the camera line-of-sight module 214 and sends (transmits) the white balance value 222 to firmware 218. The firmware 218 applies the white balance value 222 as a parameter used to process an image of the object captured by the camera 210. As mentioned above, it is contemplated in some examples that the white balance value 222 can override or replace a preconfigured white balance value. In one example, the white balance module 216 obtains the white balance value 222 from a data table (e.g., a lookup table) of white balance values 222 that correspond to various sun positions. In one example, the white balance values 222 may be expressed in color temperature (degrees kelvin) and the white balance values 222 may be indexed by sun position. In another example, a data table can contain an abstracted sun position (e.g., sunrise, morning, midmorning, noon, afternoon, evening, sunset) and a color temperature that corresponds to the abstracted sun position. In one example, the white balance values 222 can be stored in a memory device included in the camera system 204. In another example, the white balance values 222 can be stored in a remote location that is accessible to the camera system 204 via an input connection or network (e.g., an external hard drive, an external system located in a vehicle that includes the camera system 204, a remote data center, etc.).

In one example, the white balance module 216 can be configured to use additional information to determine a white balance value 222. For example, in addition to sun position, other information related to conditions which may affect image quality can be provided to the white balance module 216, including current weather information. As an example, current weather information for a place where an object is located can be obtained via an auxiliary input 212, and the white balance module 216 can use the current weather information and sun position to determine a white balance value 222 used to capture/process an image of the object. For example, a data table of white balance values 222 can be indexed by sun position and weather (e.g., clear sky, light overcast, moderate overcast, and heavy overcast), and the white balance module 216 can reference the data table to obtain a white balance value 222 that corresponds to both a current sun position and weather conditions at the location of an object.

After determining a white balance value 222, the white balance module 216 can send (transmit) the white balance value 222 to the firmware 128, as described above. The firmware 218 may provide low-level control for the hardware of the camera system 204. In particular, the firmware 218 may receive input from software modules and input devices and apply the input to systems and functions of the camera system 204. In response to receiving a white balance value 222 from the white balance module 216, the firmware 218 may use the white balance value 222 to process images captured using the camera 210.

It is contemplated that other camera settings can be determined based in part on an approximation of sun position or sun angle at a geographic location where a remote object is located. For example, exposure and gain settings can be adjusted based in part on sun position at a geographic location where an object is located. A data table containing exposure and/or gain values can be indexed by sun position, and the exposure and/or gain values can be sent to the firmware 218 to allow the exposure and/or gain values to be used to process images captured using the camera 210.

The various processes and/or other functionality contained within the camera system 204 may be executed on one or more processors that are in communication with one or more memory modules. The camera system 204 can include storage system components for one or more data stores used for storing data (e.g., sun position data 220 and white balance values 222). Storage systems can include volatile or non-volatile random access memory (RAM), optical media, hard-drive type media, and a SAN (Storage Area Network), and cloud storage network. In examples that include a network, the network may include any useful computing network, including a local area network, a wide area network, a wireless data network, or any other such network or combination thereof. Components utilized for such a network may depend at least in part upon the type of network and/or environment selected. Communication over the network may be enabled by wired or wireless connections and combinations thereof. While FIG. 2 illustrates an example of a system that may implement the techniques above, many other similar or different environments are possible. The example environments discussed and illustrated above are merely representative and not limiting.

Figure 3:
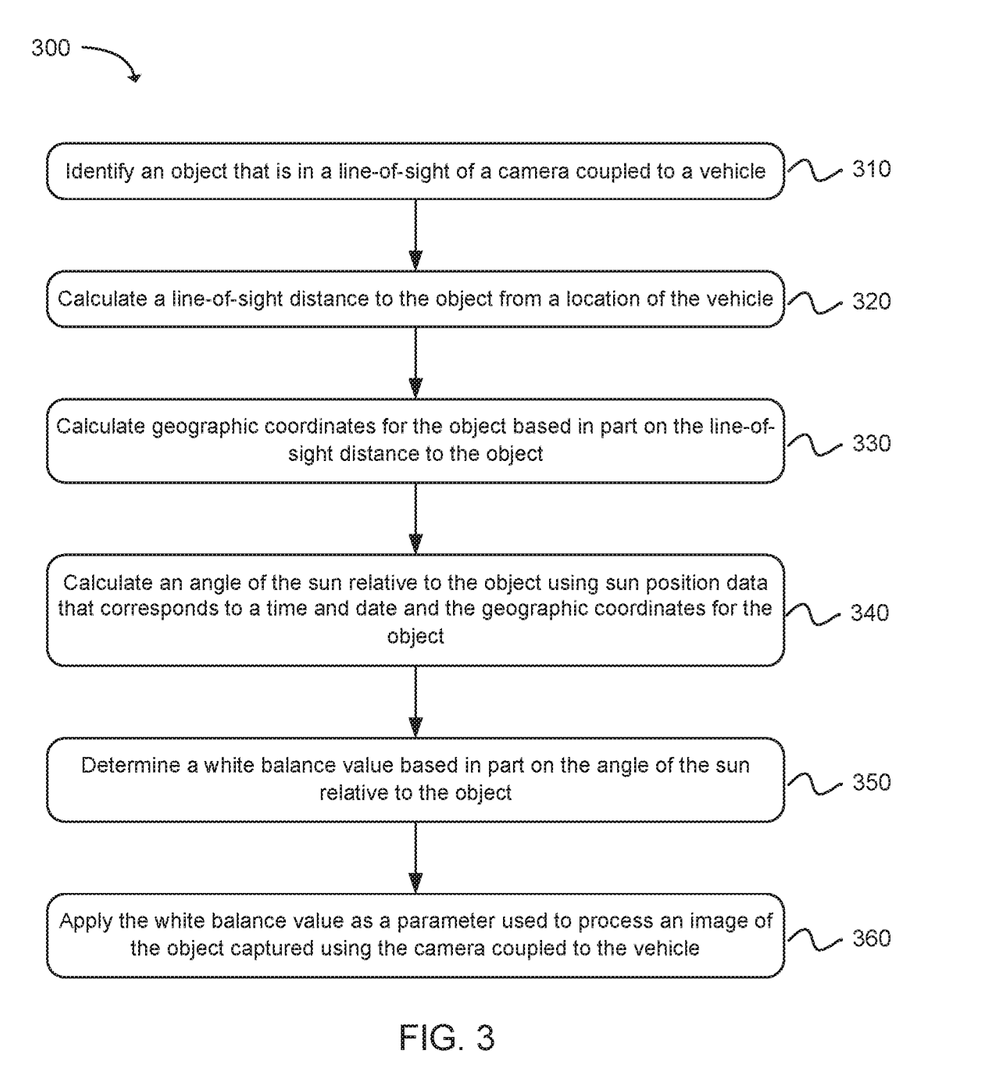
FIG. 3 is a flow diagram illustrating and example method for remote object imaging, in accordance with an example.

FIG. 3 is a flow diagram that illustrates an example method 300 for processing an image of a remote object based in part on an angle of the sun relative to the object. As in block 310, an object within a line-of-sight of a camera coupled to a vehicle (e.g., aircraft, satellite, etc.) can be identified. The object may be within a field-of-view of the camera, and the object can be manually identified, or the object can be identified using an automated targeting system comprising hardware and software configured to automatically identify and track a target object.

As in block 320, a line-of-sight distance can be calculated from the camera (or vehicle) to the object, and as in block 330, geographic coordinates for the object can be calculated based in part on the line-of-sight distance to the object. A line-of-sight distance from a camera to an object may be an unobstructed straight line (vector) distance from a camera or vehicle location to an object location. The line-of-sight distance can be determined using an appropriate distance estimation technique or system, and the line-of-sight distance can be used to calculate geographic coordinates for the object. In one example, an electro-optical targeting system (EOTS) configured to locate and track targets using cameras and laser rangefinders can be used to calculate a line-of-sight distance to an object and calculate GPS coordinates for the object using the line-of-sight distance.

After a geographic location for the object has been determined via the geographic coordinates for the object, an angle of the sun relative to the object can be calculated using sun position data, as in block 340. The sun position data may correspond to a date and time relative to the object and to the geographic coordinates for the object. The date and time can be obtained from a GPS sensor, system clock, or other appropriate source. As described earlier, a time zone associated with the object can be determined, and if the time zone associated with the object is different from a time zone associated with a location where the camera/vehicle is located, the date and/or time can be adjusted to match the time zone associated with the object. The sun position data used to calculate the angle of the sun can be obtained from a data table in which the sun position data (e.g., sun elevation and azimuth) is indexed by date, time, and geographic coordinates.

As in block 350, the angle of the sun relative to the object can be used to determine a white balance setting applied to camera settings to capture and/or process an image of the object. As an example, a white balance value that corresponds to the sun's position relative to the object can be obtained from a data table comprising white balance values that correspond to sun position values (e.g., sun elevation and azimuth). The white balance values in the data table, in one example, can be expressed in color temperature (degrees kelvin) and the white balance values may be indexed by sun position values (e.g., sun elevation and azimuth, or sun position labels such as: "sunrise", "morning", "noon", "midday", "evening", "sunset", etc.).

As in block 360, the white balance setting can be applied as a camera setting parameter and/or image processing parameter, such that the white balance setting is used to process an image of the object captured using the camera. The method 300 can be periodically repeated to update the white balance value between captures of the object (e.g., update every 1, 5, 10, or 20 images/video frames) in response to changes in sunlight at the location of the object (e.g., changes in weather conditions and/or sun position changes).

Figure 4:
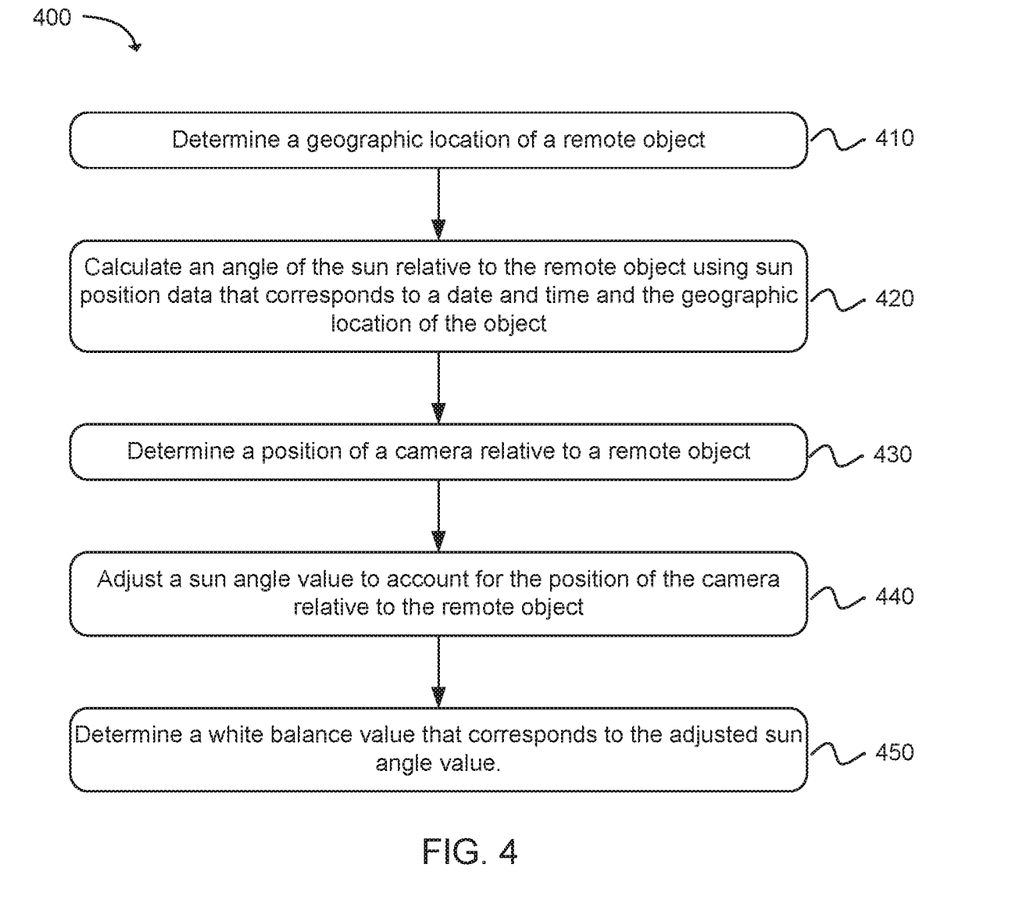
FIG. 4 is a flow diagram that illustrates an example method for adjusting a sun angle value to account for a position of a camera, in accordance with an example.

FIG. 4 is a flow diagram that illustrates an example method 400 for calculating a sun angle relative to a remote object and adjusting the sun angle to account for a position of a camera relative to the remote object. As in block 410, a geographic location for an object can be determined, and as in block 420, an angle of the sun relative to the remote object can be calculated using sun position data that corresponds to a date and time relative to the remote object and the geographic location of the object as described earlier.

After calculating the angle of the sun relative to the remote object, the angle can be adjusted to account for a position of the camera relative to the remote object. For example, as in block 430, a position of the camera relative to the remote object can be determined using a line-of-sight angle from the camera to the remote object. The line-of-sight angle from the camera to the remote object can be calculated using position data for: a camera gimbal, a vehicle (i.e., pitch, yaw, and roll) to which the camera is attached, and/or an altitude of the vehicle relative to the remote object. Thereafter, the line-of-sight angle can be used to adjust the sun angle value to account for the position of the camera relative to the remote object, as in block 440, and a white balance value that corresponds to the adjusted sun angle value can be determined, as in block 450. The white balance value can be determined by referencing a data table, as described earlier.

Figure 5:
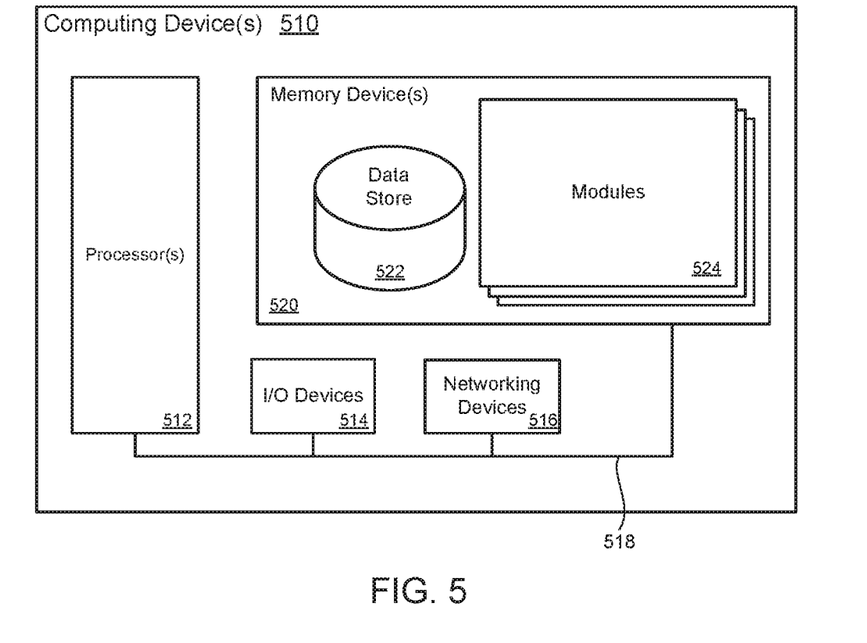
FIG. 5 is block diagram illustrating an example of a computing device that may be used to execute a method for processing images of a remote object, in accordance with an example.

FIG. 5 illustrates a computing device 510 on which modules of this technology can execute. A computing device 510 is illustrated on which a high level example of the technology can be executed. The computing device 510 can include one or more processors 512 that are in communication with memory devices 520. The computing device 510 can include a local communication interface 518 for the components in the computing device 510. For example, the local communication interface 518 can be a local data bus and/or any related address or control busses as may be desired.

The memory device 520 can contain modules 524 that are executable by the processor(s) 512 and data for the modules 524. In one example, the memory device 520 can include an operating system module, a camera line-of-sight module, a white balance module, and other modules. The modules 524 can execute the functions described earlier. A data store 522 can also be located in the memory device 520 for storing data related to the modules 524 and other applications along with an operating system that is executable by the processor(s) 512.

Other applications can also be stored in the memory device 520 and may be executable by the processor(s) 512. Components or modules discussed in this description that can be implemented in the form of software using high-level programming languages that are compiled, interpreted, or executed using a hybrid of the methods described herein.

The computing device 510 can also have access to I/O (input/output) devices 514 that are usable by the computing devices. Examples of the I/O devices 514 includes an auxiliary input that provides weather information, a GPS device, a rangefinder device, and other I/O devices 514. Networking devices 516 and similar communication devices can be included in the computing device 510. The networking devices 516 can be wired or wireless networking devices that connect to the internet, a LAN, WAN, or other computing network.

The components or modules that are shown as being stored in the memory device 520 can be executed by the processor(s) 512. The term "executable" can mean a program file that is in a form that can be executed by a processor 512. For example, a program in a higher level language can be compiled into machine code in a format that can be loaded into a random access portion of the memory device 520 and executed by the processor 512, or source code can be loaded by another executable program and interpreted to generate instructions in a random access portion of the memory to be executed by a processor. The executable program can be stored in any portion or component of the memory device 520. For example, the memory device 520 can be random access memory (RAM), read only memory (ROM), flash memory, a solid state drive, memory card, a hard drive, optical disk, floppy disk, magnetic tape, or any other memory components.

The processor 512 can represent multiple processors and the memory device 520 can represent multiple memory units that operate in parallel to the processing circuits. This can provide parallel processing channels for the processes and data in the system. The local communication interface 518 can be used as a network to facilitate communication between any of the multiple processors and multiple memories. The local communication interface 518 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for remote object imaging, comprising:
camera system of a vehicle comprising:
a camera:
an electro-optical system configured to:
calculate geographic coordinates for the object using in part a line-of-sight distance to the object from the camera system;
calculate an angle of the sun relative to the object using sun position data and the geographic coordinates for the object;
a data table that stores sun position data, wherein the sun position data corresponds to a current time and date and the geographic coordinates for the object within the view of the EO system; and
a white balance module configured to determine a white balance setting based in part on the angle of the sun relative to the object within the view of the EO system and apply the white balance setting as a parameter used to process an image of the object within the view of the EO system captured using the camera.

2. The system in claim 1, wherein the camera system is further configured to obtain principal axes data for the camera coupled to the vehicle, wherein the principal axes data are used to calculate the angle of the sun relative to the object and the camera.

3. The system in claim 1, wherein the sun position data contained in the data table is indexed by times, dates, and the geographic coordinates.

4. The system in claim 1, wherein the camera system is further configured to calculate an altitude of the object, wherein the altitude of the object is used in part to calculate the angle of the sun relative to the object.

5. The system in claim 1, wherein the camera system is further configured to obtain weather condition information used in part to determine the white balance setting.

6. The system in claim 1, wherein the camera system is further configured to determine the white balance setting based in part on the line-of-sight distance to the object from the camera coupled to a vehicle.

7. The system in claim 1, wherein the system further comprises a global positioning system (GPS) sensor configured to generate geographic coordinates for the vehicle; and
wherein the camera system is further configured to identify a location of the vehicle using the geographic coordinates for the vehicle, wherein the location of the vehicle is used to calculate the geographic coordinates for the object based in part on the line-of-sight distance of the object from the vehicle.

8. The system in claim 7, wherein the GPS sensor further comprises a global positioning system/inertial navigation system (GPS/INS) configured to generate position and angle data for the vehicle, wherein the position and angle data are used to calculate the geographic coordinates for the object based in part on the line-of-sight distance of the object from the vehicle.

9. The system in claim 7, wherein the camera system is further configured to obtain the time and date from the GPS sensor used to determine the angle of sunlight on the object.

10. A computer implemented method, comprising:
identifying an object that is in a line-of-sight and within view of a camera of a camera system coupled to a vehicle;
calculating, by a line-of-sight module of the camera system, a line-of-sight distance to the object from a location of the vehicle; calculating, by an electro-optical system of the camera system, geographic coordinates for the object based in part on the line-of-sight distance to the object
obtain sun position data from a data table, wherein the sun position data corresponds to a current time and date and the geographic coordinates for the object within the view of the EO system;
calculating an angle of the sun relative to the object within the view of the EO system using the sun position data;
determining a white balance setting based in part on the angle of the sun relative to the object within the view of the EO system; and
applying the white balance setting as a parameter used to process an image of the object within the view of the EO system captured using a camera coupled to the vehicle.

11. The computer implemented method in claim 10, wherein determining the white balance setting further comprises selecting the white balance setting based in part on weather parameters associated with a location of the object and the line-of-sight distance to the object from the camera coupled to the vehicle.

12. The computer implemented method in claim 10, wherein the object is located on a ground surface.

13. The computer implemented method in claim 10, wherein the object is a moving object.

14. The computer implemented method in claim 10, wherein the object is an airborne object.

15. The computer implemented method in claim 10, wherein the vehicle is an aircraft.

16. The computer implemented method in claim 10, wherein the vehicle is a satellite.

17. A non-transitory machine readable storage medium including instructions embodied thereon, wherein the instructions, when executed by at least one processor:
receive geographic coordinates for an object identified using an electro-optical (EO) system coupled to a vehicle, wherein the object is within a view of the EO system and the EO system is configured to calculate the geographic coordinates for the object within the view of the EO system;
obtain sun position data from a data table, wherein the sun position data corresponds to a current time and date and the geographic coordinates for the object within the view of the EO system;
calculate an angle of the sun relative to the object within the view of the EO system using the sun position data;
determine a white balance setting based in part on the angle of the sun relative to the object within the view of the EO system; and
apply the white balance setting as a parameter used to process an image of the object within the view of the EO system captured using a camera coupled to the vehicle.

18. The non-transitory machine readable storage medium in claim 17, wherein the instructions, that when executed by the at least one processor, further:
obtain weather condition information associated with a location of the object; and
determine the white balance setting based in part on the weather condition information.

19. The non-transitory machine readable storage medium in claim 17, wherein the instructions, that when executed by the at least one processor, further determine the white balance setting based in part on a line-of-sight distance to the object from the camera coupled to the vehicle.

* * * * *